(12) United States Patent
Sprafke (10) Patent No.: US 9,228,894 B2
(45) Date of Patent: Jan. 5, 2016

(54) OPTICAL SENSOR AND FILTER ASSEMBLY WITH EPOXY MOUNTING STRUCTURE AND METHOD OF ASSEMBLY

(71) Applicant: TELEDYNE SCIENTIFIC & IMAGING, LLC, Thousand Oaks, CA (US)

(72) Inventor: Thomas P. Sprafke, Malibu, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 88 days.

(21) Appl. No.: 14/252,455

(22) Filed: Apr. 14, 2014

(65) Prior Publication Data

US 2015/0292943 A1    Oct. 15, 2015

(51) Int. Cl.

| | |
|---|---|
| *G01J 3/50* | (2006.01) |
| *G01J 3/02* | (2006.01) |
| *G01J 1/44* | (2006.01) |
| *G01J 3/12* | (2006.01) |
| *B29C 65/00* | (2006.01) |
| *B29C 65/48* | (2006.01) |
| *B29L 11/00* | (2006.01) |
| *B29K 63/00* | (2006.01) |
| *B29L 31/34* | (2006.01) |

(52) U.S. Cl.
CPC .............. *G01J 3/0205* (2013.01); *B29C 65/002* (2013.01); *B29C 65/4875* (2013.01); *G01J 1/44* (2013.01); *G01J 3/12* (2013.01); *B29K 2063/00* (2013.01); *B29L 2011/00* (2013.01); *B29L 2031/34* (2013.01); *G01J 2003/1213* (2013.01)

(58) Field of Classification Search
CPC ............. G01J 3/0205; G01J 3/12; G01J 1/44; B29C 65/002

USPC ............... 250/226, 239, 214.1; 257/290–292, 257/440–444, 432–436; 385/9–12
See application file for complete search history.

(56) References Cited

U.S. PATENT DOCUMENTS

| | | | |
|---|---|---|---|
| 5,568,186 A | * | 10/1996 | Althouse .................. G01J 3/06 250/332 |
| 5,689,106 A | | 11/1997 | Dahlin |
| 5,734,156 A | | 3/1998 | Dahlin et al. |

OTHER PUBLICATIONS

Gluck et al., "Two-color imaging by the use of patterned optical filters bonded to ocal-plane-array detectors," Applied Optics, vol. 35, No. 28, Oct. 1, 1996, pp. 5520-5523.

* cited by examiner

*Primary Examiner* — Que T Le
(74) *Attorney, Agent, or Firm* — Eric A. Gifford (57) ABSTRACT

A mounting structure between the spectral filter and optical sensor includes one or more beads of epoxy that are bonded to the face of the sensor at locations adjacent and bonded to the edge of the spectral filter around its perimeter. Placement of the epoxy so that it bonds to the edge of the spectral filter improves the robustness of the package to sheer stresses. Placement of the epoxy at the edge, suitably in discrete spot bonds, also avoids putting epoxy in the optical path, contaminating the optically active area or using epoxy to control the gap height. Alignment of the spectral filter in the plane (x,y) may be achieved using fiducial marks on the sensor and filter. Alignment of the spectral filter out of the plane (z) may be achieved using incompressible spacer balls that set the gap height precisely to the diameter of the ball. Alternately, the spectral filter may be placed in direct contact with the optically active area of the sensor.

20 Claims, 7 Drawing Sheets

OPTICAL SENSOR AND FILTER ASSEMBLY WITH EPOXY MOUNTING STRUCTURE AND METHOD OF ASSEMBLY

GOVERNMENT RIGHTS

This invention was made with partial Government support therefore; the Government has certain rights in this invention.

BACKGROUND OF THE INVENTION

1. Field of the Invention

This invention relates to mounting planar spectral filters to planar optical sensors and more specifically to a mounting structure and method using beads of epoxy bonded around the edge of the filter to the face of the sensor, and in certain configurations spacer balls that form standoff structures between the sensor and filter.

2. Description of the Related Art

A planar optical sensor includes a detector layer configured to detect incident light in an optically active area by converting photons to electrical charge, a readout integrated circuit (ROIC) that lies below the detector layer, and an array of cold-welded metal interconnects that connect the ROIC to the detector layer. The ROIC is configured to read out electrical charge through each interconnect corresponding to different regions on the detector layer to form a pixilated analog or digital signal.

The array of cold-welded metal interconnects is formed by first placing small bumps of soft metal, typically indium, at precise locations on each of the ROIC and the detector layer, precisely aligning the detector layer to the ROIC so that the bumps align and pressing the detector layer onto the ROIC to "cold fuse" the bumps to form a metal interconnect. This "hybridization" process is well established in the optical sensor industry for mounting the detector layer to the ROIC but does require expensive equipment and processes. The hybridization process is subject to variation due to compression force, number and size of indium bumps, and the volume of the indium bumps but is sufficient to provide reliable metal interconnects.

An optical sensor assembly also includes a spectral filter that passes one or more wavelength bands of interest. The spectral filter may pass a single wide band or multiple narrow bands. Individual bands or "zones" may be spatially registered to different x,y pixels or groups of pixel on the detector layer/ROIC. Placement of the filter in close proximity (e.g. 1 um to 350 um microns are typical depending on wavelength) to the sensor is critical to the sensor's optical performance. The spacing or "gap" in the z direction must be precisely and uniformly controlled across the optically active area.

A mounting structure should provide the required alignment fidelity in both the x,y directions in plane and z direction out of plane. The mounting structure must be sufficiently strong to withstand sheer stresses on the assembly, and should not transfer those stressed between the filter and sensor. The mounting structure should not introduce any structure into the optical path between the filter and the detector active area or contaminate the active area. The process for mounting the filter onto the assembly should not be prohibitively expensive.

The industry standard is to mount the filter to a bezel using epoxy and then mount the bezel onto the optical sensor assembly using mechanical fasteners. The bezel mounting configurations have increased volumetric size due to the added structure of the bezel. In addition, the bezel structure and its fasteners increase the system mass. This increase in mass requires adding additional features to the detector baseplate to achieve a robust and stiff design needed to overcome vibration.

Another approach is to place a thin layer of a curable, transparent adhesive such as an epoxy between the filter and the detector layer. The components are pressed together with the aid of appropriate tooling to a desired spacing prior to curing of the adhesive. After curing, the components are permanently bonded together with the layer of adhesive.

As described in U.S. Pat. Nos. 5,689,106 and 5,734,156, while operable, this fabrication technique has drawbacks. The adhesive bonding approach has relatively loose assembly tolerances in both the direction lying in the plane of the components and in the spacing between the components. The assembly time is relatively long, on the order of 12 hours, due to the need to at least partially cure the adhesive in the tooling. In operation of the device, the light reaching the sensor must pass through the adhesive layer, which attenuates and possibly distorts the light. The contact of the cured adhesive to the faces of the optical components can adversely affect their service lives.

U.S. Pat. Nos. 5,689,106 and 5,734,156 disclose using the hybridization process used to connect the detector layer to the ROIC, or a variant thereof, to join the filter to the optical sensor. The standoff structures comprise bonding elements (e.g. deformable metal bumps such as indium) on each of the filter and the optical sensor (outside the active area) that are cold-welded to form the structure. A standoff such as formed from silicon may be placed between the bonding elements. Alignment of the x/y position is achieved by precision placement and alignment of the bonding elements. Alignment of the z position is achieved by the metal standoff structure.

The hybridization approach provides an advance in the art of fabrication and assembly of optical devices in which two components in an optical train must be bonded together. The assembly cost is reduced due to a reduction in the bonding time. Tolerances are improved due to the stability of a metal bonding element as compared with a cured adhesive, which can distort as it cures. Optical performance is improved because no adhesive lies in the optical path, and the components are separated only by a gap. Long-term stability of the device is improved because no adhesive touches the faces of either of the components.

SUMMARY OF THE INVENTION

The present invention provides a mounting structure and method of assembly using epoxy. This approach provides advancement over the metal hybridization approach without the drawbacks of conventional epoxy techniques.

In an embodiment, an optical sensor and filter assembly comprises a planar spectral filter having a first face and an edge around the filter's perimeter and a planar optical sensor having a second face and an optically active area thereon. A mounting structure joins the filter to the sensor. The mounting structure comprises one or more beads of a first epoxy bonded to the second face of the planar sensor at locations adjacent and bonded to the edge of the spectral filter around the filter's perimeter, suitably in multiple discrete locations about the perimeter. The first epoxy suitably comprises a two-part multi-ratio epoxy that cures by chemical reaction, heat or light. The mounting structure may place the filter in direct contact with the sensor's optically active area or may include a plurality of standoff structures positioned at discrete locations, suitably staggered with respect to the epoxy beads, outside the optically active area to define a gap between the filter and the sensor. Each standoff structure may comprise one or more incompressible spacer balls that form a single layer to set the height of the gap. Each standoff structure may further comprise a bond pad and a second epoxy that bonds the spacer balls to the bond pad and the filter's first face. The bond pad may have a lip that confines the second epoxy and spacer balls until that epoxy cures. The mounting structure may comprise fiducial marks on the sensor and filter to align the components within the plane.

In an embodiment, a method of mounting a spectral filter to an optical sensor comprises providing a planar spectral filter having a first face and a planar optical sensor having a first face, an optically active area on the first face, and a plurality of bond pads around the optically active area on the first face, each bond pad having a lip. A first epoxy having a plurality of incompressible spacer balls suspended therein is injected onto each bond pad. Fiducial marks on the planar optical sensor and the planar spectral filter are used to align the planar spectral filter to the planar optical sensor with appropriate tooling. The planar spectral filter is pressed down onto the sensor to compress the first epoxy so that the spacer balls form a single layer that sets a height of a gap between the planar optical sensor and the planar spectral filter. The bond pad lip confines the first epoxy and spacer balls to the bond pad until the first epoxy cures. Spot bonds of a UV epoxy are suitably formed around the perimeter of the filter to hold the filter in place while the first epoxy cures. The method may also comprise spot bonding a plurality of beads of a second epoxy to the second face of the planar sensor at discrete locations adjacent and bonded to an edge of the optical filter around the filter's perimeter. These spot bonds are suitably staggered with the spacer balls. The spot bonds to the edge of the filter provide significantly more strength than the bonds to the face of the filter.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a mounting structure and method of assembly using epoxy. This approach provides advancement over the hybridization approach without the drawbacks of conventional epoxy techniques.

In different embodiments, the bond strength between the spectral filter and optical sensor is provided by one or more beads of epoxy that are bonded to the face of the sensor at locations adjacent and bonded to the edge of the spectral filter around its perimeter. Placement of the epoxy so that it bonds to the edge of the spectral filter improves the robustness of the package to sheer stresses. Placement of the epoxy at the edge, suitably in discrete spot bonds, also avoids putting epoxy in the optical path, contaminating the optically active area or using epoxy to control the gap height. Alignment of the spectral filter in the plane (x,y) may be achieved using fiducial marks on the sensor and filter. Alignment of the spectral filter out of the plane (z) may be achieved using incompressible spacer balls that set the gap height precisely to the diameter of the spacer ball. Alternately, the spectral filter may be placed in direct contact with the optically active area of the sensor. Epoxy mixed with the spacer balls may enhance package strength. An improved mounting structure and method of assembly is achieved by separating the functions of joining the filter to the sensor, aligning the filter in the plane and aligning the filter out of the plane.

The epoxies are suitably a two-part multi-ratio epoxy that cures by chemical reaction, heat or light. A UV curable epoxy may be used to spot bond the filter in place while the other epoxies are applied and allowed to cure. The UV curable epoxy is generally not sufficiently strong to join the filter to the optical sensor. The epoxy placed on the bond pad between the optical sensor and filter is primarily used as a means for positioning the spacer balls and holding the spacer balls between the filter and the sensor. The epoxy bonds between the faces of the optical sensor and filter are fairly week in the face of sheer stress. The epoxy placed on the face of the optical sensor adjacent and bonded to the exposed edge of the filter provides the primary means for joining the filter to the optical sensor. The later two epoxies may be the same or different epoxies. Epoxy selection is somewhat dependent on the sensor's operating temperature. Ideal epoxies have low to medium modulus and can handle temperature extremes from 20K to 325K. Epoxies such as Nusil CV-1600 (RTV) and 3M Scotchweld EC-2216 (3:2 mix ratio) are suitable adhesives.

Figures 1A, 1B, 1C:
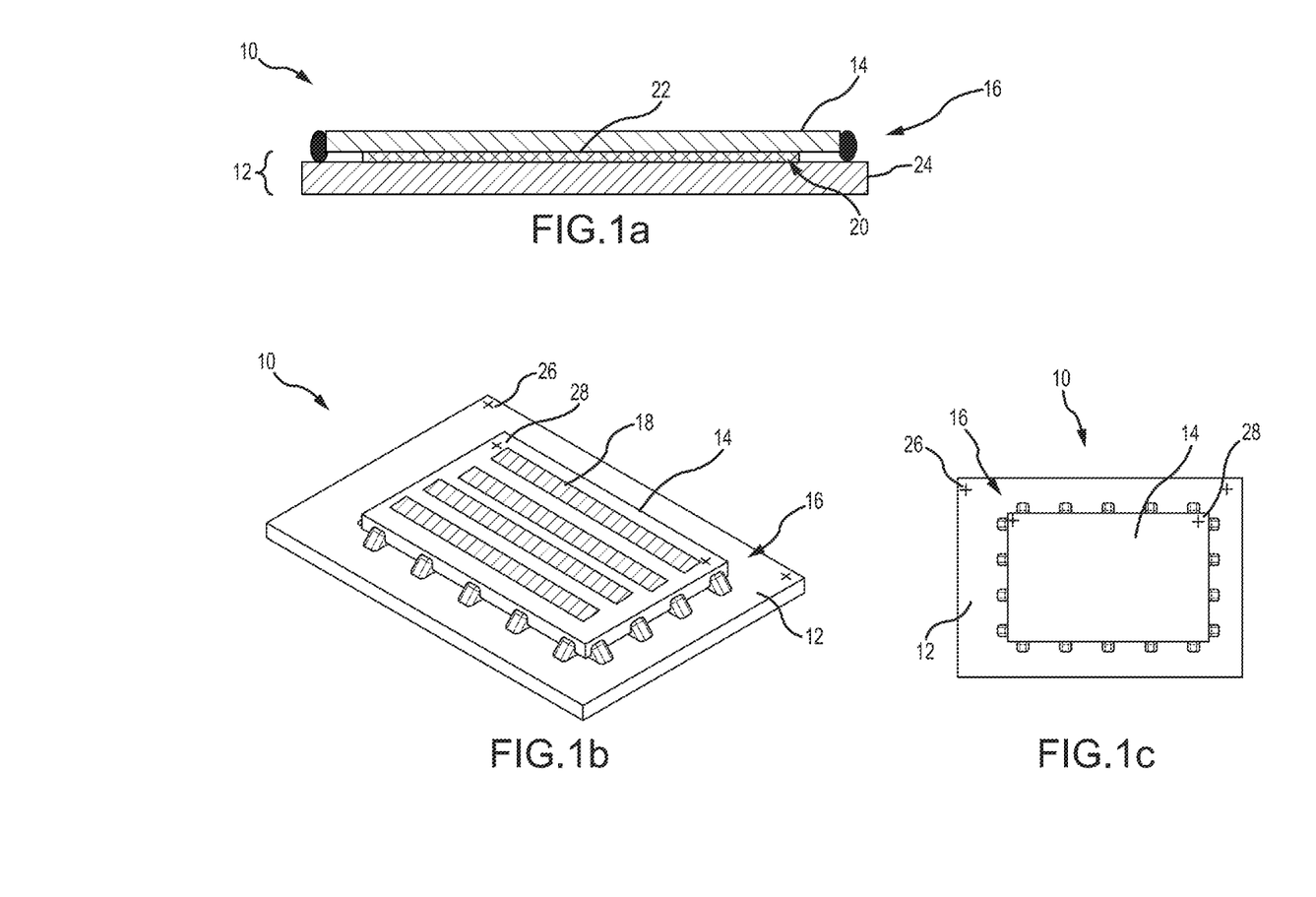
FIGS. 1a through 1c are different views of an embodiment of a sensor and optical filter assembly in which the spectral filter is mounted directly on the sensor's optically active area.

With reference to FIGS. 1a through 1c, an optical sensor and filter assembly 10 comprises a planar optical sensor 12, a planar spectral filter 14 that passes one or more wavelength bands of interest of the incident light and a mounting structure 16 for joining planar spectral filter 14 directly to planar optical sensor 12. Mounting structure 16 suitably provides a mechanical bond for joining the filter to the sensor, in plane (x,y) alignment and out of plane (z) alignment. Individual bands or "zones" 18 of filter 14 may be spatially registered to different x,y pixels or groups of pixel on the optical sensor. Placement of the filter in close proximity (e.g. 1 um to 350 um microns are typical depending on wavelength) to the sensor is critical to the sensor's optical performance. The spacing or "gap" in the z direction must be precisely and uniformly controlled across the optically active area. In this embodiment, the face of the filter is mounted directly on the face of the optical sensor so the gap is zero. Conventional epoxy techniques and hybridization do not enable mounting the filter directly on the optical sensor. For certain wavelength ranges e.g. 300 nm-15 um, the ability to direct mount the filter will improve optical performance.

Planar optical sensor 12 may include a detector layer 20 configured to detect incident light in an optically active area 22 by converting photons to electrical charge, a readout integrated circuit (ROIC) 24 that lies below the detector layer 20, and an array of cold-welded metal interconnects (not shown) that connect the ROIC to the detector layer. The ROIC is configured to read out electrical charge through each interconnect corresponding to different regions on the detector layer to form a pixilated analog or digital signal. The array of cold-welded metal interconnects may be formed using the hybridization process.

Mounting structure 16 may comprise fiducial marks 26 and 28 on or in ROIC 24 of optical sensor 12 and spectral filter 14, respectively. At least two such fiducial marks are required on each component to align filter 14 to optical sensor 12 in both offset and rotation in the plane (x,y). The filter is aligned to the optical sensor using the fiducial marks with the aid of appropriate tooling. If the fiducial marks 26 and 28 are formed in the detector layer and filter as part of the lithography of the masking layers the fiducial marks can be very precisely positioned with respect to the optically active area 22 of the sensor and the different zones 18 of the filter. Mounting structure 16 may comprise other means to align the filter to the sensor such as the general relationship between circuitry on the ROIC and the spectral bands of the filter.

Spot bonds of a UV epoxy (not shown) are suitably formed around the perimeter of the filter to hold the filter in place once it is aligned. These spot bonds cure very quickly under UV exposure but are relatively weak to thermally cured epoxies.

Mounting structure 16 may comprise multiple beads 30 of an epoxy bonded to the face of the planar optical sensor (the face of the ROIC outside optically active area 22 of detector layer 20) at locations adjacent and bonded to the edge 32 of planar spectral filter 14 around the filter's perimeter. The beads are positioned outside the footprint of filter 14 on the face of optical sensor 12. Incremental spot bonds are the preferred method of filter attachment. Incremental spot bonds have less stress than would a single continuous bead around the perimeter, and allow for depressurization under vacuum. The bonds formed between beads 30 and the edge 32 of planar spectral filter 14 are robust as a result of their shape, number of bonds, and aspect ratio. The epoxy is suitably a thermally cured two-part epoxy such as Nusil CV-1600 (RTV) and 3M Scotchweld EC-2216 (3:2 mix ratio).

Figure 2A:
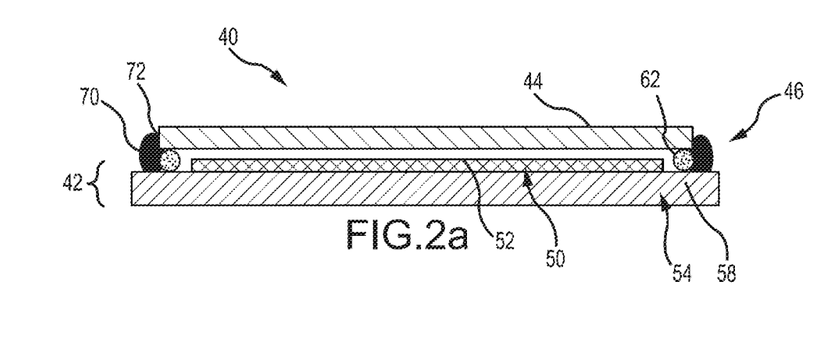
FIGS. 2a through 2c are different views of an embodiment of a sensor and optical filter assembly in which the spectral filter is mounted above the optical sensor.
Figure 2B:
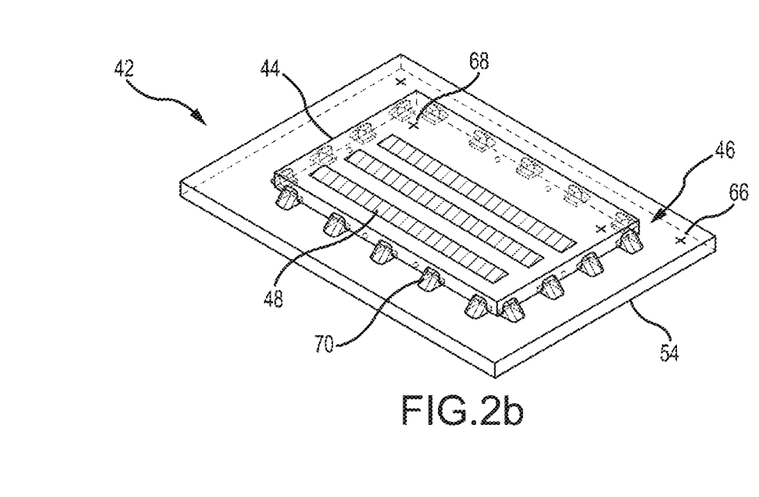
Figure 2C:
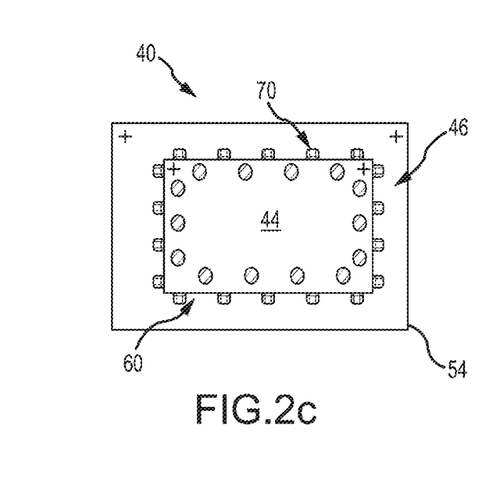

With reference to FIGS. 2a through 2c, an optical sensor and filter assembly 40 comprises a planar optical sensor 42, a planar spectral filter 44 that passes one or more wavelength bands of interest of the incident light and a mounting structure 46 for joining planar spectral filter 44 to planar optical sensor 42 at a uniform gap "z". Mounting structure 46 suitably provides a mechanical bond for joining the filter to the sensor, in plane (x,y) alignment and out of plane (z) alignment. Individual bands or "zones" 48 of filter 44 may be spatially registered to different x,y pixels or groups of pixel on the optical sensor. Placement of the filter in close proximity (e.g. 1 um to 350 um microns are typical depending on wavelength) to the sensor is critical to the sensor's optical performance. The spacing or "gap" in the z direction must be precisely and uniformly controlled across the optically active area. Planar optical sensor 42 may include a detector layer 50 configured to detect incident light in an optically active area 52 by converting photons to electrical charge, a readout integrated circuit (ROIC) 54 that lies below the detector layer 50, and an array of cold-welded metal interconnects (not shown) that connect the ROIC to the detector layer. The ROIC is configured to read out electrical charge through each interconnect corresponding to different regions on the detector layer to form a pixilated analog or digital signal. The array of cold-welded metal interconnects may be formed using the hybridization process.

Mounting structure 46 may a plurality of standoff structures 58 positioned at discrete locations outside the optically active area 52 and inside a footprint 60 of the filter on the face of ROIC 54, and between the planar optical sensor 42 and the planar spectral filter 44 to define the gap there between. Each standoff structure suitably comprises one or more spacer balls 62. The spacer balls are suitably formed of a hard, incompressible material such as silica, aluminum nitride, alumina, titanium, boron, and various types of glass. The height 'z' of the gap is equal to the diameter of the spacer balls. Typical sizes range from 5 um to 2 mm in diameter, and can be tailored to establish the desired filter spacing between the detector and the filter. The beads are not compressed between the filter and sensor. The one or more spacer balls 62 may be held in place with an epoxy.

Mounting structure 46 may comprise fiducial marks 66 and 68 on or in ROIC 54 of optical sensor 42 and spectral filter 44, respectively. At least two such fiducial marks are required on each component to align filter 44 to optical sensor 42 in both offset and rotation in the plane (x,y). The filter is aligned to the optical sensor using the fiducial marks with the aid of appropriate tooling. If the fiducial marks 66 and 68 are formed in the detector layer and filter as part of the lithography of the masking layers the fiducial marks can be very precisely position with respect to the optically active area 52 of the sensor and the different zones 48 of the filter. Mounting structure 46 may comprise other means to align the filter to the sensor such as using the general relationship between circuitry on the ROIC to the spectral bands of the filter.

Spot bonds of a UV epoxy (not shown) are may be formed around the perimeter of the filter to hold the filter in place once it is aligned. These spot bonds cure very quickly under UV exposure but are relatively weak to thermally cured epoxies. These spot bonds may or may not be required it an epoxy is provided with spacer balls 62.

Mounting structure 46 may comprise multiple beads 70 of an epoxy bonded to the face of the planar optical sensor (the face of the ROIC outside optically active area 52 of detector layer 50) at locations adjacent and bonded to the edge 72 of planar spectral filter 44 around the filter's perimeter. The beads are positioned outside the footprint of filter 44 on the face of optical sensor 42. Incremental spot bonds are the preferred method of filter attachment. Incremental spot bonds have less stress than would a single continuous bead around the perimeter, and allow for depressurization under vacuum. The spot bonds formed by beads 70 are preferably staggered with respect to the standoff structures 58. The bonds formed between beads 70 and the edge 72 of planar spectral filter 44 are robust because of their shape, number of bonds, and aspect ratio. The epoxy is suitably a thermally cured two-part epoxy such as Nusil CV-1600 (RTV) and 3M Scotchweld EC-2216 (3:2 mix ratio).

Figure 3A:
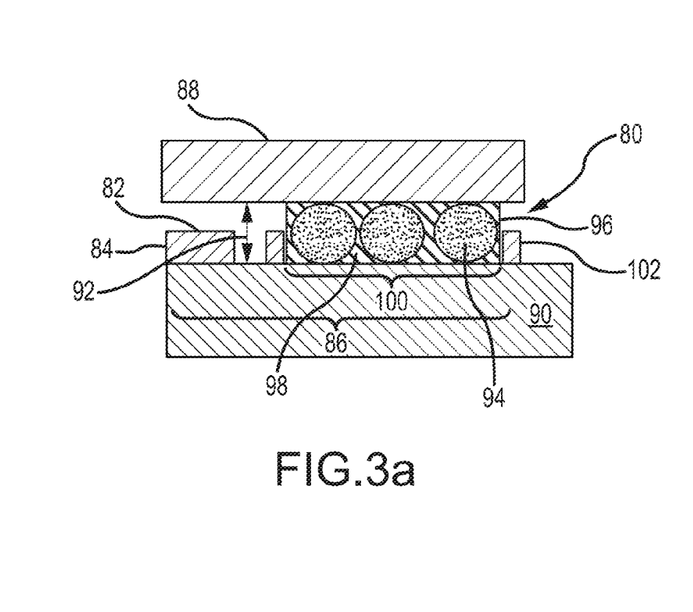
FIGS. 3a and 3b are different views of an embodiment of a standoff structure comprising a plurality of incompressible spacer balls in an epoxy mixture that form a single layer.
Figure 3B:
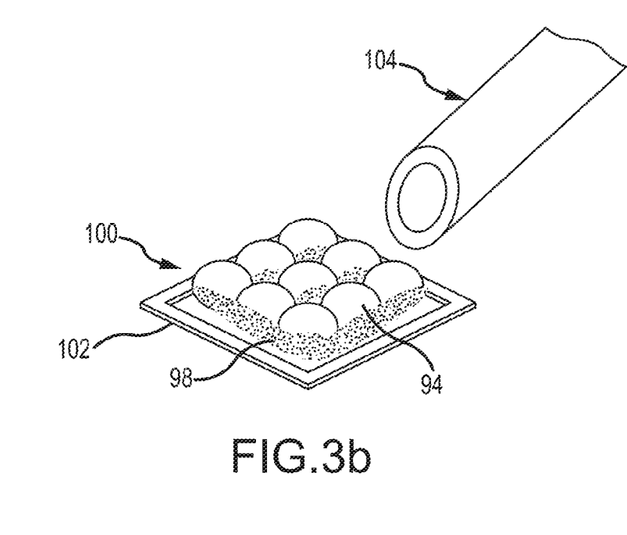
Figure 4A:
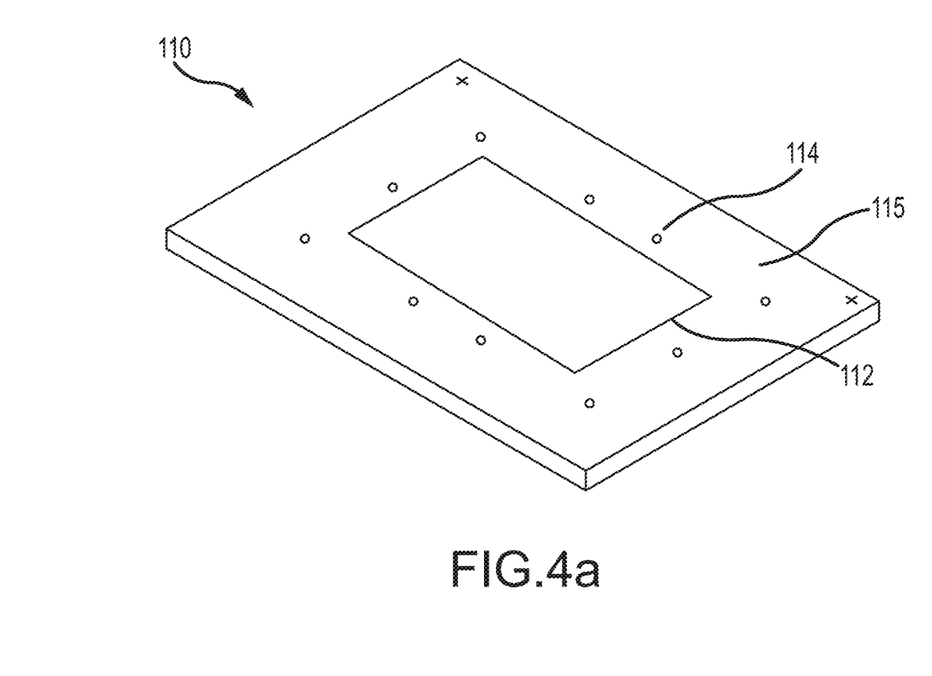
FIGS. 4a through 4d are a sequence of views of an embodiment for mounting the spectral filter on the optical sensor using fiducial marks to align the filter, spacer balls to form the standoff structure and beads of epoxy to bond the filter to the sensor.
Figure 4B:
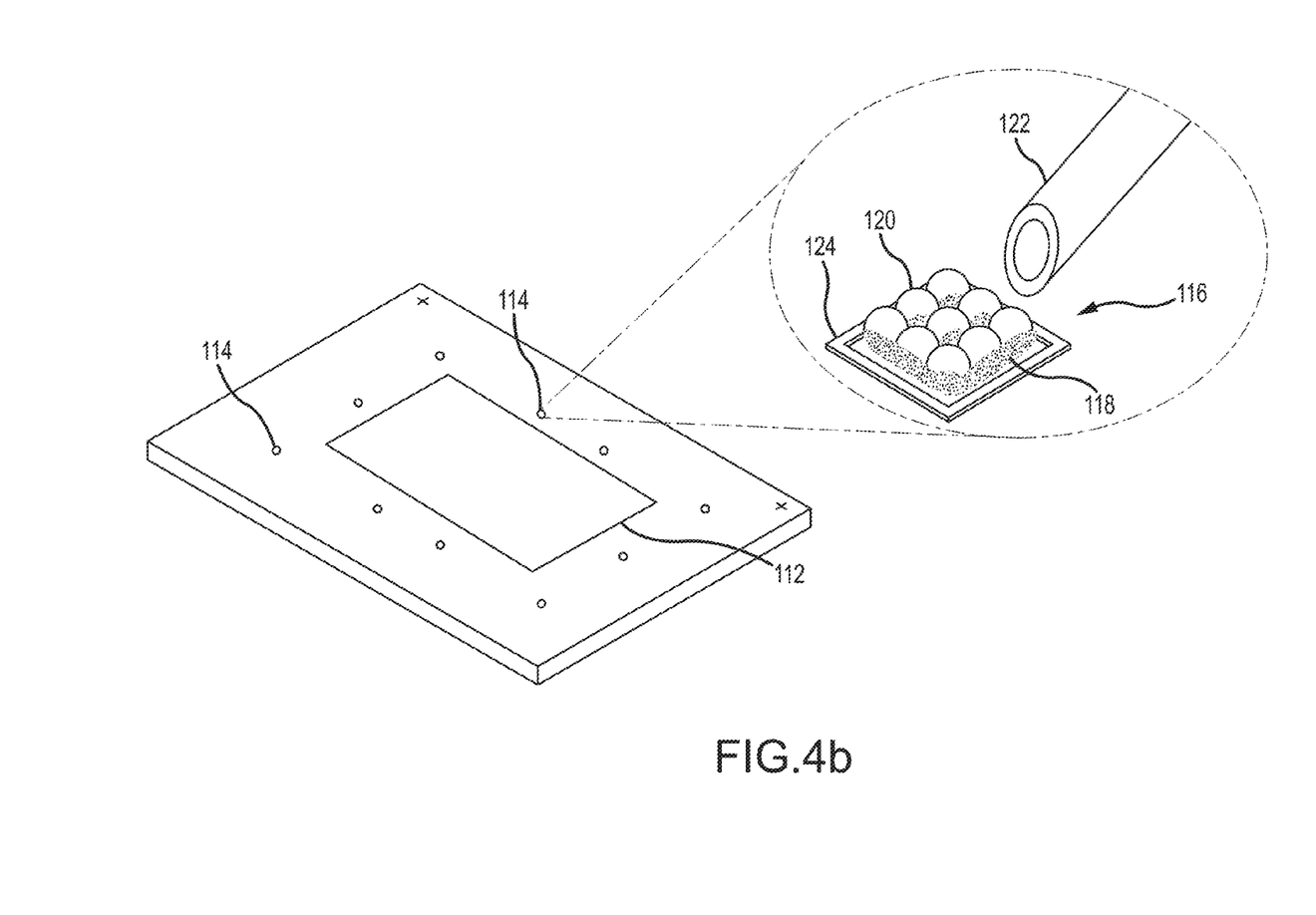
Figure 4C:
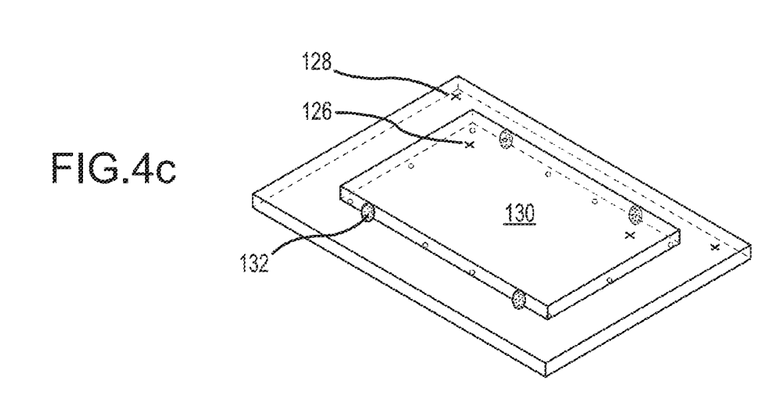
Figure 4D:
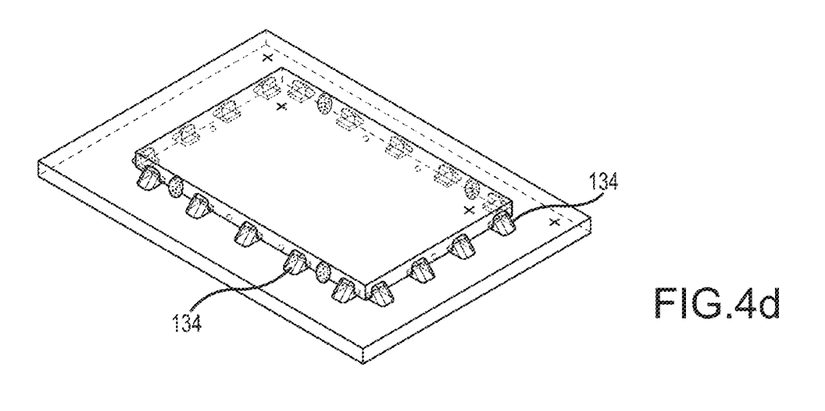

With reference to FIGS. 3a and 3b, an embodiment of a standoff structure 80 is positioned at discrete locations outside an optically active area 82 of detector layer 84 and inside a footprint 86 of a filter 88 on the face of a ROIC 90, and between the ROIC 90 and filter 88 to define a gap 92 there between. Each standoff structure 80 includes a plurality of spacer balls 94 arranged in a single uniform layer 96 within an epoxy 98 on a bond pad 100. Bond pad 100 suitably comprises a lip 102 formed around the perimeter of the bond pad to confine the epoxy 98 and spacer balls 94 on the bond pad. The height of lip 102 is less than the diameter of the spacer balls.

To form standoff structures 80, spacer balls 94 are mixed into epoxy 98 in a desired ratio. The epoxy is applied either manually with a syringe 104, or automated using a precision dispense machine in desired locations. The epoxy suitably has intermediate viscosity, as to not be excessively "runny", yet fluid enough to be dispensed through a small needle. The epoxy is loaded with a specific ratio of spacer balls per adhesive volume. The epoxy holds the spacer balls in place, and prevents them from moving around after curing. The amount of squeeze-out is regulated as a result of the spacer balls diameter. Once the two surfaces are compressed, the "spacer balls" set the height, and the epoxy keeps them in place. Most epoxies deemed desirable for bonding spacer balls have medium viscosity to low viscosity. This makes the epoxy sensitive to creep. The surface of the ROIC and the filter are very clean, smooth, and have low-coefficient of friction. This allows the epoxy to run or creep. Epoxy that creeps onto the optically active area is detrimental to the sensor's performance, and could render a sensor unusable. To prevent the migration of epoxies, small indium squares or circles are deposited on the upper surface of the ROIC to form bond pads 100. These features form a lip 102 that act as a dam, and create enough surface tension to prevent the epoxy from migrating. In addition, these features provide a target for the operator to place the epoxy prior to assembling the filter. The spot bonds are preferably offset (staggered) from the spacer balls to avoid gluing epoxy to epoxy. This bond is not as strong as epoxy to the rough filter edge. Providing epoxy with spacer balls provides some strength so you distribute connections more uniformly. For certain packaged devices intended for use in less stressful applications, the bond provided by this epoxy may be sufficient. In those packages, the spot bonds to the edge of the filter may be omitted.

With reference to FIGS. 4a through 4d, a method of assembling an optical sensor and filter assembly comprises providing a planar optical sensor 110 having an optically active area 112 and a plurality of bond pads 114 at discrete locations around the optically active area on a ROIC 115. A mixture 116 of epoxy 118 and spacer balls 120 is injected through a needle 122 onto each bond pad 114. A lip 124 of the bond pad acts as a dam to confine the mixture until the epoxy cures. Fiducial marks 126 and 128 on a planar spectral filter 130 and optical sensor 110 located outside the optically active area 112 are used to align filter 130 to optical sensor 110. Before epoxy 118 cures, the filter 130 is pressed down to compress the mixture 116 on each bond pad 114 into a single layer of spacer balls 120. The diameter of the spacer balls precisely sets the gap between the filter and the optical sensor. A few spot bonds 132 of a UV curable epoxy are placed around the perimeter of the filter and radiated with UV light to hold the filter in place. Structural spot bonds 134 of a thermally cured epoxy are placed around the perimeter of the filter and thermally cured to form the structural bond for the assembly.

Figure 5:
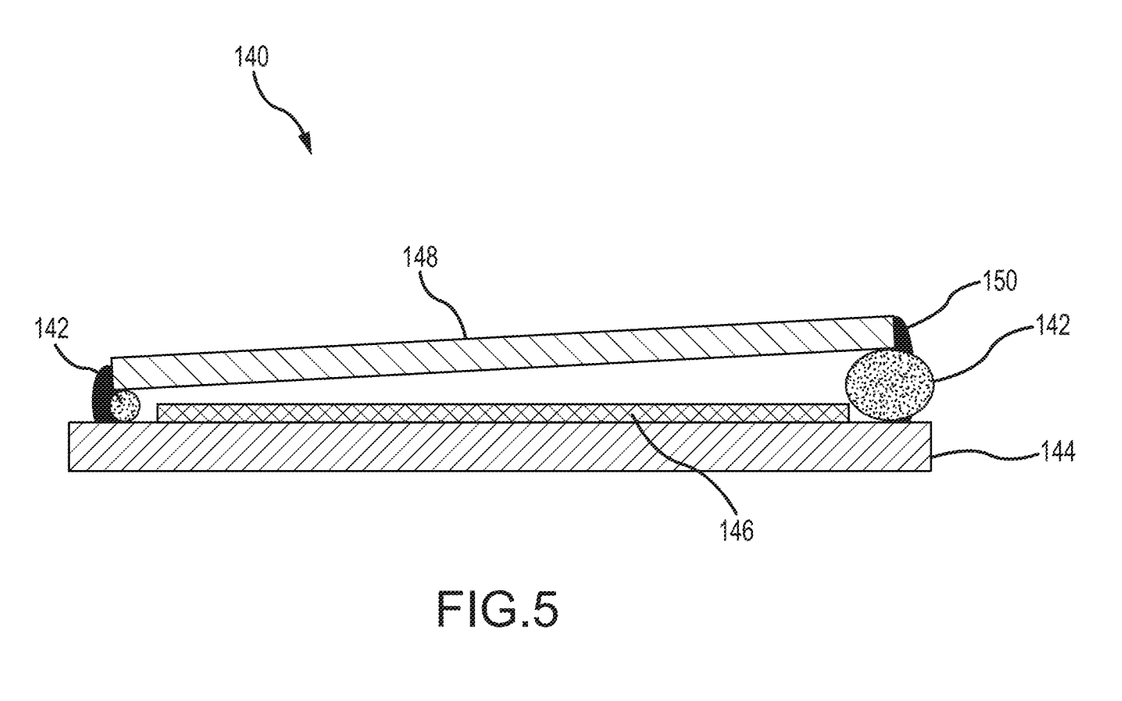
FIG. 5 is a view of an embodiment of a sensor and optical filter assembly in which the spectral filter is mounted above the sensor with a non-uniform spacing.

With reference to FIG. 5, an embodiment of an optical sensor and filter assembly 140 uses spacer balls 142 of different diameters to form a gap whose height increases from one side of the assembly to the other. Spacer balls 142 are positioned on the surface of an ROIC 144 outside the optically active area 146. A filter 148 is aligned and mounted on top of the spacer ball 142. Beads 150 of epoxy are placed around the filter of the perimeter where they are bonded to the edge of the filter and the surface of the ROIC.

In an embodiment, all of the spacer balls 142 on one side of the assembly have a diameter D1 so that all of the standoff structures on that side are of the same height. All of the spacer balls 142 on the oppose side of the assembly have a diameter D2>D1 so that all of the standoff structures on that are of the same height. The difference in diameters causes the height of the gap to increase from one side to another. To better support the filter 148, spacer balls of an intermediate diameter between D1 and D2 may be placed along the package. Each standoff structure may be constructed as shown in FIGS. 3a and 3b using an epoxy mixture with spacer balls of the appropriate diameter.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. An optical sensor and filter assembly, comprising:
    a planar spectral filter having a first face and an edge around the filter's perimeter;
    a planar optical sensor having a second face and an optically active area thereon; and
    a mounting structure for joining the planar spectral filter to the planar optical sensor, said mounting structure comprising one or more beads of a first epoxy bonded to the second face of the planar optical sensor at locations adjacent and bonded to the edge of the planar spectral filter around the filter's perimeter.

2. The optical sensor and filter assembly of claim 1, wherein the first epoxy comprises a two-part multi-ratio epoxy that cures by chemical reaction, heat or light.

3. The optical sensor and filter assembly of claim 1, wherein the planar optical sensor comprises,
    a detector layer configured to detect incident light by converting photons to electrical charge,
    a readout integrated circuit (ROIC) that lies below the detector layer, and
    an array of cold-welded metal interconnects that connect the ROIC to the detector layer,
    wherein said ROIC is configured to read out electrical charge through each interconnect corresponding to different regions on the detector layer.

4. The optical sensor and filter assembly of claim 1, wherein the first face of the planar spectral filter is in direct contact with the second face of the planar optical sensor in the optically active area.

5. The optical sensor and filter assembly of claim 4, wherein said mounting structure comprises a plurality of said beads spaced at discrete locations around the filter's perimeter.

6. The optical sensor and filter assembly of claim 5, wherein said beads are not compressed between the first face of the planar spectral filter and the second face of the planar optical sensor.

7. The optical sensor and filter assembly of claim 1, wherein the mounting structure further comprises:
    a plurality of standoff structures positioned at discrete locations outside the optically active area and between the planar optical sensor and the planar spectral filter to define a gap there between, each said standoff structure comprising one or more spacer balls that set the height of the gap.

8. The optical sensor and filter assembly of claim 7, wherein said spacer balls are formed of a hard, incompressible material, the height of the gap being equal to the diameter of the spacer balls.

9. The optical sensor and filter assembly of claim 7, wherein the mounting structure comprises a plurality of said beads spaced at discrete locations around the filter's perimeter and staggered with the discrete locations of the standoff structures.

10. The optical sensor and filter assembly of claim 9, wherein said beads are not compressed between the first face of the planar optical filter and the second face of the planar sensor.

11. The optical sensor and filter assembly of claim 7, wherein each said standoff structure comprises:

a bond pad on the second face of the planar optical sensor;
a plurality of spacer balls arranged in a single uniform layer on the bond pad to set the height of the gap; and
a second epoxy that bonds the spacer balls to the bond pad and forms a spot bond to the first face of the planar spectral filter,
wherein said bond pad comprises a lip that confines the second epoxy and spacer balls, a height of said lip being smaller than the diameter of the spacer balls.

12. The optical sensor and filter assembly of claim 11, wherein the spacer balls in each said standoff structure have the same diameter, and wherein the diameters of the spacer balls in the standoff structures from a first side of the assembly to an opposing second side increases such that the height of the gap increases from the first side of the assembly to the opposing second side.

13. The optical sensor and filter assembly of claim 11, wherein said planar spectral filter and said planar optical sensor each comprise fiducial marks positioned outside the optically active area that align the planar spectral filter to the planar optical sensor.

14. An optical sensor and filter assembly, comprising:
a planar spectral filter having a first face;
a planar optical sensor having a second face and an optically active area thereon; and
a mounting structure for joining the planar spectral filter to the planar optical sensor with a gap there between, said mounting structure comprising a plurality of standoff structures positioned at discrete locations outside the optically active area, each said standoff structure comprising a bond pad on the second face of the planar optical sensor outside the optically active area, a plurality of spacer balls arranged in a single uniform layer on the bond pad, and a first epoxy that bonds the spacer balls to the bond pad and the first face of the planar spectral filter, said bond pad having a lip that confines the spacer balls and the first epoxy, said lip having a height smaller than the diameter of the spacer balls, said diameter of the spacer balls setting the height of the gap.

15. The optical sensor and filter assembly of claim 14, wherein the mounting structure further comprises one or more beads of a second epoxy bonded to the second face of the planar optical sensor at locations adjacent and bonded to an edge of the planar spectral filter around the filter's perimeter.

16. The optical sensor and filter assembly of claim 15, wherein the mounting structure comprises a plurality of said beads that are spaced at discrete locations around the filter's perimeter and staggered with the discrete locations of the standoff structures.

17. The optical sensor and filter assembly of claim 14, wherein said planar spectral filter and said planar optical sensor each comprise fiducial marks positioned outside the optically active area that align the planar spectral filter to the planar optical sensor.

18. A method of assembling an optical sensor and filter assembly, comprising:
providing a planar spectral filter having a first face, said filter having at least one fiducial mark formed thereon;
providing a planar optical sensor having a first face, an optically active area on the first face, and a plurality of bond pads around the optically active area on the first face, each said bond pad having a lip, said planar optical sensor having at least one fiducial mark formed thereon;
injecting a first epoxy having a plurality of spacer balls suspended therein onto each bond pad;
using the fiducial marks to align the planar spectral filter to the planar optical sensor;
pressing the planar spectral filter down to compress the first epoxy so that the spacer balls form a single layer that sets a height of a gap between the planar spectral filter and the planar optical sensor, said bond pad lip confining the first epoxy and spacer balls to the bond pad until the first epoxy cures; and
forming spot bonds of a UV epoxy around the perimeter of the planar spectral filter to hold the filter in place while the first epoxy cures.

19. The method of claim 18, wherein said spacer balls are formed of a hard, incompressible material so that the height of the gap equals the diameter of the spacer balls.

20. The method of claim 18, further comprising
spot bonding a plurality of beads of a second epoxy to the second face of the planar optical sensor at discrete locations adjacent and bonded to an edge of the planar spectral filter around the filter's perimeter.

* * * * *